United States Patent [19]

Namiki

[11] 4,240,189
[45] Dec. 23, 1980

[54] METHOD OF PRODUCING HEAT PIPE ROLLER

[75] Inventor: Ryoichi Namiki, Hino, Japan

[73] Assignee: Ricoh Company, Ltd., Japan

[21] Appl. No.: 861,419

[22] Filed: Dec. 16, 1977

[30] Foreign Application Priority Data

Dec. 25, 1976 [JP] Japan .................. 51/157160

[51] Int. Cl.³ ...................... B23P 15/26; F28D 15/00
[52] U.S. Cl. .............. 29/157.3 R; 165/105; 29/157.3 H
[58] Field of Search ........... 29/157.4, 157.3 R, 157.3; 165/105

[56] References Cited

U.S. PATENT DOCUMENTS

| 2,096,250 | 10/1937 | Kasarjian ................. 165/105 X |
| 3,587,725 | 6/1971 | Basiulis ................... 165/105 |
| 3,672,020 | 6/1972 | Freggens ................. 29/157.3 R |
| 3,769,674 | 11/1973 | Droughton et al. ....... 29/157.3 R |
| 3,797,086 | 3/1974 | Asselman ................ 29/157.3 R |

*Primary Examiner*—Francis S. Husar
*Assistant Examiner*—V. K. Rising
*Attorney, Agent, or Firm*—McGlew and Tuttle

[57] ABSTRACT

A method of producing a heat pipe roller having a chamber for holding a heating medium therein is disclosed, wherein sealing means for sealing the heat pipe roller are connected to an upper end plate of the heat pipe roller through a hole formed in the upper end plate. The heat pipe roller containing a heating medium therein is heated at temperatures above the boiling point of the heating medium and finally the heat pipe roller is sealed by use of the sealing means after adjusting the degree of vacuum or pressure in the heat pipe roller to a predetermined degree.

7 Claims, 5 Drawing Figures

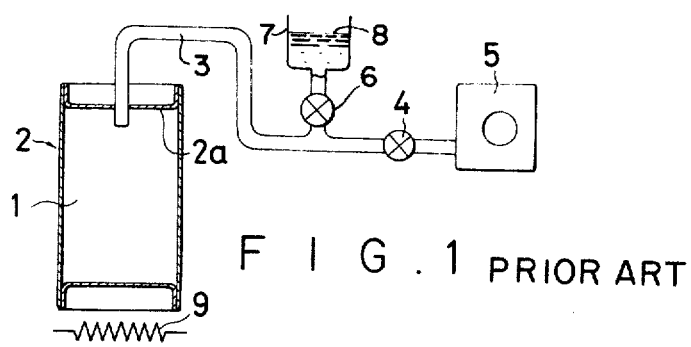
FIG. 1 PRIOR ART
FIG. 2
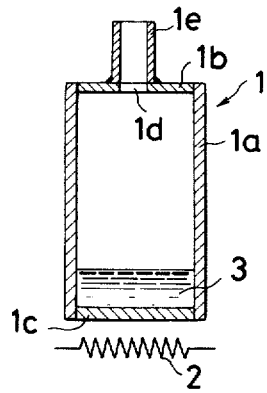
FIG. 3
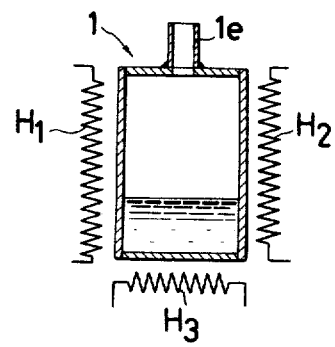
FIG. 4
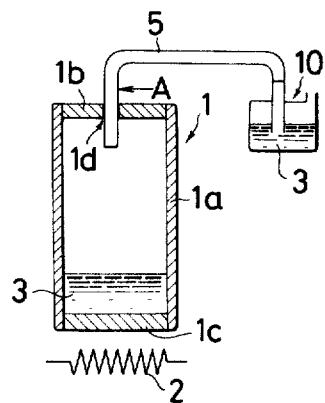
FIG. 5
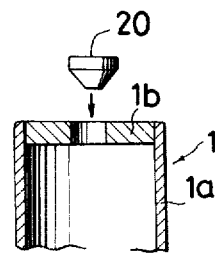

METHOD OF PRODUCING HEAT PIPE ROLLER

BACKGROUND OF THE INVENTION

The present invention relates to a production method of a heat pipe roller holding a heating medium therein.

In the heating rollers as employed in copying apparatus or the like, it is preferable that the temperature of the heating rollers can be elevated speedily to a predetermined temperature.

In some conventional copying apparatus a heat pipe roller containing a heating medium which is vaporized by heating, is employed to attain a speedy elevation of temperature.

FIG. 1 shows the conventional apparatus for producing a heat pipe roller. In the figure, heat pipe roller 2 having a chamber for holding a heating medium therein is made of a heat resistant metal and is formed so as to be free from any leakage of the heating medium. One end of a pipe 3 is inserted into one end plate 2a of the heat pipe roller 2, and the other end of the pipe 3 is connected to a vacuum pump 5 through a valve 4. Another pipe extends from the pipe 3, between the heat pipe roller 2 and the vacuum pump 5 and is connected to a tank 7 through a valve 6. Heating medium 8 is placed in the tank 7. When this conventional apparatus is used, the heat pipe roller 2 is produced by the following steps. The heat pipe roller 2 is heated by heater 9 so that dust and oily dirt which might adhere to the interior wall of the heat pipe roller 2 are removed by combustion, and at the same time, the heat pipe roller 2 is evacuated with the vacuum pump 5.

When the heat pipe roller 2 has cooled, the heating medium is loaded into the heat pipe roller 2. Since the pressure in the heat pipe roller 2 is lowered while the heat pipe roller cools, the pressure (or the vacuum level) in the roller has to be readjusted to a predetermined pressure by the vacuum pump 5, and then the heat pipe roller is sealed.

In this conventional method, the whole apparatus has to be designed so as to be made airtight and free from any leakage of the heating medium, particularly when the heating medium is loaded into the heat pipe roller. This results in that the apparatus has a shortcoming of being rather expensive and involving the above-mentioned complicated steps.

Alternatively, there is a method in which air in the heat pipe roller is replaced by an inert gas, such as helium, after the heating medium has been loaded into the heat pipe. The inert gas is then sucked from the chamber by the vacuum pump in order to obtain a predetermined vacuum level in the heat pipe. This method as well has the same shortcoming as in the above-mentioned method.

SUMMARY OF THE INVENTION

It is therefore an object of the present invention to eliminate the above-mentioned shortcoming of the conventional method of producing heat pipe rollers and to provide a method of producing heat pipe rollers easily, speedily and cheaply with a reduced number of production steps without utilizing a vacuum system.

In a heat pipe roller according to the present invention, a heat pipe roller consists of an upper end plate having a hole at the center of the upper end plate, a bottom plate and a side wall which form a chamber. These members are made integral so as to be free from any leakage of a heating medium to be placed in the heat pipe roller. A tube for sealing the heat pipe roller is fixed to the upper end plate of the heat pipe roller in the manner in which an inner hole of the tube opens into the hole of the end plate. One or more heaters are disposed near the heat pipe roller. One method of producing a heat pipe roller by sealing a heating medium therein according to the present invention is as follows. A predetermined amount of a heating medium, such as SK oil and KSK oil, whose boiling points are in the range of 200° C., is placed in the heat pipe roller. Then the heat pipe roller is heated up to temperatures above the boiling point of the heating medium. As the container is heated to the temperatures, the heating medium is vigorously evaporated through the tube and air in the heat pipe roller is discharged. After a predetermined time, the pipe is closed. Thus, a heat pipe with a predetermined degree of vacuum can be obtained.

In another method according to the invention, the tube for sealing the heat pipe is connected with a heating medium tank and while the heat pipe roller is heated the vaporized heating medium is bubbled in the tank. Thus no adverse materials or gases go back into the heat piper roller when the heating medium is evaporated and before the tube is closed.

In a further method according to the invention, instead of the above-mentioned tube, a metallic stopper is used. The stopper is tightly fitted into the hole formed in the upper end plate of the heat pipe roller when a predetermined degree of vacuum is obtained in the heat pipe roller.

BRIEF DESCRIPTION OF THE DRAWINGS

FIG. 1 is a schematic illustration of the conventional apparatus for producing a heat pipe roller.

FIG. 2 is a schematic sectional view of an apparatus utilized in producing a heat pipe roller according to a method of the present invention.

FIG. 3 is a schematic sectional view of another apparatus utilized in producing a heat pipe roller according to the present invention.

FIG. 4 is a schematic sectional view of a further apparatus utilized in producing a heat pipe roller according to the present invention.

FIG. 5 is a schematic sectional view of a stopper utilized in sealing a heat pipe roller according to the invention.

DETAILED DESCRIPTION OF THE PREFERRED EMBODIMENTS

In FIG. 2, container 1 is a main body of a heat pipe roller according to the invention. It comprises side wall 1a, upper end plate 1b having hole 1d at the center of the upper end plate 1b, and bottom plate 1c, thus a chamber is formed for holding a heating medium. These members are made of a heat resistant metal or other heat resistant material and are constructed integrally so as to be free from any leakage of the heating medium. Tube 1e for sealing the container 1 is fixed to the upper end plate 1b by welding or other means and an inner hole of the tube 1e opens into the hole 1d. The tube 1e is made of a material convenient for sealing the container 1, such as copper and copper alloy. Near the bottom of the container 1 is disposed heater 2 for heating the container 1.

A predetermined amount of heating medium 3, such as water, SK oil comprising p-cymene (bp, 175° C.), and KSK oil (commercial trade mark), is loaded into the thus constructed container 1 through the inner hole of the tube 1e. The container 1 is then heated up to temperatures above the boiling point of the heating medium 3 by the heater 2 whose heating temperature is set, for example, at 200° C.

As the container 1 is heated, the heating medium 3 is vigorously evaporated, and the container 1 is filled with the vapor of the heating medium 3, whereby air remaining in the container 1 is discharged out of the container 1 through the pipe 1e.

After a predetermined time, the pipe 1e is closed by caulking or fusing, thus the container, filled with the vapor of the heating medium 3 and the unvaporized heating medium 3, is sealed.

In the heat pipe roller produced by the above-mentioned procedure, it is preferable that the inner diameter of the container 1 is at least more than 10 times that of the inner hole of the pipe 1e, since, in such a diameter ratio, the inner pressure of the container 1 can be sufficiently raised and consequently air and combustion gases of dirt or of dust can be discharged out of the container 1 by the vapor pressure of the heating medium 3.

It is also preferable that the ratio of the outer diameter of the tube 1e to the inner diameter is not more than 3:2.5 for convenience of caulking or fusing of the pipe when the container 1 is sealed.

In experimental the cases where air was discharged from the container 1, when the ratio of the sectional area $S_1$ of the inner hole of the tube 1e to the total surface area $S_0$ of the container 1, namely $S_1/S_0$, was less than 1/100, the degree of vacuum obtained in the container was not more than $10^{-1}$ Torr. In order to obtain a higher vacuum degree, it was preferable to reduce this ratio to less than 1/1000.

In order to increase the inner pressure of the container 1, the container was heated not only from its bottom side but also from its peripheral side as shown in FIG. 3. By the arrangement of a plurality of heaters, the inner pressure of the container 1 was raised more and accordingly a higher degree of vacuum was obtained.

In FIG. 3, 50 ml of SK oil was placed in a 300 mm high container 1 having a 40 mm inner diameter and provided with a tube 1e for sealing the container 1 having a 2 mm inner diameter. By use of two 250 W and one 500 W nichorme wire heaters $H_1$, $H_2$, $H_3$, the container 1 was heated and the heating medium 3 was boiled. When the unvaporized heating medium in the container 1 was reduced to 20 ml, the pipe 1e was closed. The thus obtained degree of vacuum was $5 \times 10^{-3}$ Torr. In this case, the ratio $S_1/S_0$ was 1/12000.

FIG. 4 shows another embodiment of the heat pipe roller according to the invention. In the figure, the members identical to the previously described members in FIG. 2 are given the same reference numbers, respectively.

In FIG. 4, tank 10 in which the heating medium 3 is held, is disposed outside the container 1. The heating medium 3 is placed in the container 1 in advance. Then the container 1 and the tank 10 are connected by the pipe 5. One end of the pipe 5 is inserted into the heating medium 3 in the tank 10. The container 1 is then heated by the heater 2 until the heating medium 3 is vigorously evaporated. A stream of the vapor of the heating medium and air from the container 1 is bubbled through the heating medium 3 in the tank 10 via the tube 5. In this case, it is preferable to precool the tank 10 for efficient recovery of the vaporized heating medium. Since the heating medium 3 in the tank 10 is at least lower in temperature than the vaporized heating medium from the container 1, the vapor of the heating medium from the container 1 is liquefied in the tank 10. After continuing the heating of the container 1 and the bubbling of the vaporized heating medium for a predetermined period of time, the tube 5 is closed at the position indicated by arrow A in FIG. 3 by caulking or fusing. Thus the container, which serves as the heat pipe roller 1, is constructed. The above-mentioned pipe 5 can be made of the same material as that of the sealing tube 1e.

FIG. 5 shows another embodiment of a sealing member for use in the heat pipe roller according to the invention. Sealing members 20 is provided for sealing engagement into the hole 1d formed at the center of the upper end plate 1b of the container 1. Sealing member 20, which is made of a material softer than that of the container, for example, a material selected from the group consisting of copper, copper-lead alloy, zinc, and the alloys of the above-mentioned metals in the cases where the container is made of stainless steel. The sealing member 20 is fitted into the hole 1d at the final stage of the production of the container so that the heating medium and the vapor thereof are tightly sealed up in the container. While specific embodiments of the invention have been shown and described in detail to illustrate the application of the principles of the invention, it will be understood that the invention may be embodied otherwise without departing from such principles.

I claim:

1. A method of producing a heat pipe roller having a chamber with a heating medium therein, the heat pipe roller having a hole which opens into said chamber, comprising the steps of:
    orienting the heat pipe roller upright so that the hole extends upwardly,
    placing a predetermined amount of the heating medium into said chamber through the hole,
    connecting the heat pipe roller with a tank in which additional heating medium is held, through a tube, one end of which is tightly connected to the hole of the heat pipe roller and the other end of which is inserted into the additional heating medium in said tank,
    heating the heat pipe roller to a temperature above the boiling point of the heating medium to vaporize a portion of the heating medium in said chamber so that the vapor of the heating medium fills said chamber entirely and other gases are evacuated from the heat pipe roller through the tube and into the heating medium in said tank, letting the other gases bubble into the heating medium in said tank, and
    closing said tube to seal said chamber from the outside while said heating medium is vigorously being vaporized.

2. A method according to claim 1, including the step of providing the tube having one end tightly connected to the hole of the heat pipe roller with a ratio between an outer diameter thereof and an inner diameter thereof of not more than 3:2.5.

3. A method according to claim 1, including the step of providing the tube with an inside sectional area which is less than 1/100th of a total inside surface area of the heat pipe roller.

4. A method according to claim 1, including the step of making the tube of a softer material than that of the heat pipe roller.

5. A method according to claim 1, including the step of caulking the tube closed to seal the chamber.

6. A method according to claim 1, including the step of fusing the tube closed to seal the chamber.

7. A method according to claim 1, including the step of precooling the tank in which additional heating medium is held.

* * * * *